(12) United States Patent
Singh

(10) Patent No.: US 6,665,704 B1
(45) Date of Patent: Dec. 16, 2003

(54) BOUNDING DELAYS AND REDUCING THREADING OVERHEADS IN CACHING

(75) Inventor: Inderjeet Singh, Mountain View, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/335,752

(22) Filed: Jun. 18, 1999

(51) Int. Cl.[7] ............................................. G06F 15/16
(52) U.S. Cl. ....................................... 709/203; 709/330
(58) Field of Search ............................... 709/203, 204, 709/202, 209, 210, 211, 219, 228, 234, 304, 106, 103

(56) References Cited

U.S. PATENT DOCUMENTS

| | | | | |
|---|---|---|---|---|
| 5,430,876 A | * | 7/1995 | Schreiber et al. | 708/815 |
| 5,452,459 A | * | 9/1995 | Drury et al. | 707/3 |
| 5,673,322 A | | 9/1997 | Pepe et al. | 380/49 |
| 5,727,203 A | * | 3/1998 | Hapner et al. | 707/103 R |
| 5,796,954 A | * | 8/1998 | Hanif et al. | 709/104 |
| 5,828,880 A | * | 10/1998 | Hanko | 709/106 |
| 5,878,213 A | * | 3/1999 | Bittinger et al. | 709/203 |
| 5,898,832 A | * | 4/1999 | Feridun | 709/203 |
| 5,925,098 A | * | 7/1999 | Freund et al. | 709/203 |
| 6,026,474 A | * | 2/2000 | Carter et al. | 707/10 |
| 6,035,324 A | * | 3/2000 | Chang et al. | 709/203 |
| 6,049,821 A | * | 4/2000 | Theriault et al. | 709/203 |
| 6,125,382 A | * | 9/2000 | Brobst et al. | 709/102 |
| 6,128,615 A | * | 10/2000 | Molloy | 707/103 R |
| 6,170,013 B1 | * | 1/2001 | Murata | 709/225 |
| 6,175,877 B1 | * | 1/2001 | Zerber | 709/203 |
| 6,192,391 B1 | * | 2/2001 | Ohtani | 709/201 |
| 6,226,689 B1 | * | 5/2001 | Shah et al. | 709/314 |
| 6,247,050 B1 | * | 6/2001 | Tso et al. | 709/203 |
| 6,253,234 B1 | * | 6/2001 | Hunt et al. | 707/10 |
| 6,292,802 B1 | * | 9/2001 | Kessenich et al. | 707/101 |
| 6,304,967 B1 | * | 10/2001 | Braddy | 713/150 |
| 6,317,761 B1 | * | 11/2001 | Landsman et al. | 705/27 |

(List continued on next page.)

FOREIGN PATENT DOCUMENTS

| | | |
|---|---|---|
| EP | 0 713 311 A1 | 5/1996 |
| GB | 2 318 031 A | 4/1996 |

OTHER PUBLICATIONS

Thekkath et al., "Impact of Sharing–Based Thread Placement on multithreaded Architectures", 1994, pp. 176–186.*

Alkalaj et al., "Performance of Multi–threaded Execution in a Share–Memory Multiprocessor", 1991, IEEE, pp. 330–333.*

Zuberak et al., "Performance Bounds for Distributed Memory Multithreaded Architectures", 1998, IEEE, pp. 232–237.*

(List continued on next page.)

*Primary Examiner*—Bunjob Jaroenchonwanit
(74) *Attorney, Agent, or Firm*—Finnegan, Henderson, Farabow, Garrett & Dunner, L.L.P.

(57) ABSTRACT

A proxy server containing a cache for retrieving information from a server and transmitting this information to multiple concurrent clients. A thread is created for each client requesting the information from the server. As long as information is contained in the cache, all the threads assume the role of a consumer thread by retrieving this information from the cache and placing it in an output stream to be sent to the client associated with each consumer thread. When one of the threads reaches the end of the information contained in the cache, it assumes the role of a producer to send a request to the server to retrieve additional information. When the producer thread receives the information from the server, it places it in an input stream for the cache. The producer thread then reverts back to a consumer thread to retrieve this information for its associated client. All other consumer threads may also retrieve this data from the cache. In retrieving information from the server, there may be multiple producers and consumers, however it is preferable that only one thread will be a producer at any given time.

27 Claims, 7 Drawing Sheets

U.S. PATENT DOCUMENTS

| | | | | |
|---|---|---|---|---|
| 6,324,182 B1 | * | 11/2001 | Burns et al. | 370/429 |
| 6,338,064 B1 | * | 1/2002 | Ault et al. | 707/10 |
| 6,345,303 B1 | * | 2/2002 | Knauerhase et al. | 707/10 |
| 6,363,410 B1 | * | 3/2002 | Kanamori et al. | 709/104 |
| 6,366,947 B1 | * | 4/2002 | Kavner | 709/203 |
| 2002/0073155 A1 | * | 6/2002 | Anupam et al. | 709/205 |

OTHER PUBLICATIONS

Morris et al., "Reducing Overheads in Distributed Shared Memory systems", 1997, IEEE, pp. 244–252.*

Wada et al., "Synchronous Control for Retrieval of Data with Java in distributed Multimedia Databases", Oct. 1998, International Conference on Communication Technology, pp. 1–7.*

Dean et al., "Techniques for Software Thread Integration in Real–Time Embedded Systems", 10/98, IEEE, pp. 322–333 (12).*

Dossick et al., "WWW access to legacy client/server applications", Computer Networks and ISDN Systems, North Holland Publishing, Amsterdam, NL, vol. 28, No. 11, May 1, 1996, pp. 931–940.

http://www.spyglass.com/products/proserver, Spyglass: "SurfWatch ProServer from Spyglass," Oct. 7, 1996, pp. 1–3.

Bellovin et al., "Network Firewalls," IEEE Communications Magazine, IEEE Service Center, vol. 32, No. 9, Piscataway, NJ, Sep. 1, 1994, pp. 50–57.

* cited by examiner

BOUNDING DELAYS AND REDUCING THREADING OVERHEADS IN CACHING

FIELD OF THE INVENTION

This invention relates to retrieving information for client processes and, in particular, to using cache memory to service multiple concurrent requests while maintaining boundaries on the delay to service any one client process.

BACKGROUND OF THE INVENTION

The Internet has experienced phenomenal growth in recent years, in part due to the explosion of e-commerce and its increased use for educational and entertainment purposes. More and more business and consumers are relying on the Internet for information. However, unfortunately, the capacity enhancements of the Internet backbone have not kept up with the Internet's increased usage and geographical span. The result of this is that users experiencing network delays in accessing websites.

To address this problem, many servers, e.g., proxy servers, have begun to cache documents retrieved from web servers to speed access to their clients for subsequent requests for the document. These servers make a copy of the requested documents received from web servers and service all their local client requests by sending them this copy. A problem occurs when many clients request the same document from a web server, concurrently. How to satisfy these requests without unduly burdening a client is a nontrivial problem. The server servicing the local clients is further hampered by not knowing the size of the document that is being requested. Trying to store a document in the cache while serving it to multiple concurrent requests is difficult. Furthermore, trying to place boundaries on the delays any one client may experience while reducing the overhead processing complicates the matter even more.

Systems and methods have been established in an attempt to address these problems. FIG. 1 depicts a system of downloading a document from a server process and sending it to browser clients. The browser clients 115 and 125 request information from the web server 105. The cache entry 110 is located in a memory to be quickly accessed for a browser client. For example, it may be located in a proxy server's cache that is servicing multiple local clients including the browser client 115. Only two browser clients and one server are shown, however one skilled in the art will recognize that many browser clients may be desiring the same information from multiple web servers 105.

The Thread 1 120 is created by the thread processing component 103 in response to browser client 1 115 requesting information, or a document, from the web server 105. A thread contains the instructions necessary to retrieve the information from the web server for a client that thread is associated with. The thread processing component 103 is contained in an interface between browser clients 115, 125 and a web server 105 and has access to a cache entry 110. For example, a proxy server that interfaces with a browser client and a web server may contain the thread processing component, creating a thread in response to a client's request.

Continuing with FIG. 1, Thread 1 120 functions as a producer and consumer thread. As a producer, Thread 1 retrieves the client requested information from the web server 105. When Thread 1 120 receives the requested information from the web server 105, it will also place this information in a cache entry 110. As a consumer, it places the web server supplied information in the input stream for it's associated client, i.e., browser client 1 115. Also, when operating as a consumer thread, a thread may retrieve the requested information for a client directly from the web server, or from a secondary source, such as a cache.

Browser client 2 125 also requests the same information as requested by browser client 115. However, because browser client 1 115 already created a thread to act as a producer and consumer, Thread 2 130, created in response to browser client 2's 125 request, will only function as a consumer. Thread 2 130 will retrieve the requested information from the cache entry 110 after it has been placed there by Thread 1 120.

In this approach, however, all the information requested, e.g., an entire document, is placed in the cache entry 110 prior to the either of the threads placing, or transmitting, any information to the output streams for their respective clients. While this solution is simple and easy to manage in its approach, this solution suffers in that clients do not receive any data until all the information has been downloaded from the web server. Consequently, there is a large initial delay before any client receives any of the requested information from the web server. This is a problem because many browser clients and/or users may not be aware that the system is working and may terminate a download not knowing that the system is actually processing the downloaded request.

FIG. 2 depicts a system of downloading a document in segments, or data blocks, for client processes. Similar to the FIG. 1 approach, a producer/consumer thread 205 ("Thread 1") is created when browser client 1 115 makes a request for a document contained at the web server 105. In addition, a consumer thread is created "Thread 2" 230 for browser client 2 125 requesting the same information that browser client 1 requested. However, in this instance, Thread 1 205 downloads and stores data retrieved from the web server as smaller data blocks 218 in the cache entry 215 instead of as one complete document. As Thread 1 retrieves a smaller data block, it is placed in a data block 218 in the cache entry 215 and it is sent to browser client 1 115 via the client 1 output stream. In addition, when the data block is placed in the cache entry 215, Thread 2 will retrieve the data block from the cache entry 215 and send it to its client 125 via the client 2 output stream.

This approach solves the problem of the large initial delay, indicative of the previous approach, that a browser client suffers before receiving any of the data from the web server. In this case, as soon as a block of data is received from the web server, it is placed in the output stream so the browser client receives an indication, i.e., data from the web server 105, that the request is being processed without having to wait for the entire document to be downloaded.

However the problem with this approach is that the browser client which makes the request dictates the speed at which the cache entry 215 is filled. In FIG. 2, Thread 1 205 controls the speed at which information is retrieved from the web server 105. Thread 1 205 will not request another data block from the web server until browser client 1 115 (associated with Thread 1) receives the previously retrieved data block from the web server. Consequently, if browser client 2 125 can retrieve the data block, from the cache, faster than the browser client 1 115 can retrieve the data block sent from Thread 1 205, browser client 2 125 will incur idle time waiting on browser Client 1 115 to complete receiving previous data block. Again, this is because Thread 1 205 is in control of the downloading information from the web server 105 and Thread 2 230 is only acting as a consumer to send the information to its client.

To address this problem of having one consumer thread and consequently one browser client dictate the speed of the download for other browsers, another approach was developed which creates multiple threads to control the downloading from the web server to the cache and another thread to control the downloading from the cache to the browser client. FIG. 3 depicts a system of using multiple threads as both a producer and a consumer.

This approach isolates the activity of a producer thread, receiving the information from the web server, from that of a consumer, receiving the information from the cache to the browser client. In this solution, an independent producer thread 310 is created that is responsible for filling the cache entry 215 with data blocks of information 218.

When browser client 1 115 creates a request for information from the web server 105, a consumer thread 305 and a producer thread 310 is created. The producer thread's 310 responsibility is to fill the cache entry 215 data blocks 218 containing information from the web server 105 requested by the browser client 1 115. The consumer thread 305 then places information from the cache entry data blocks 218 into the output stream for browser client 1 115. Consumer thread 330 acts similarly to consumer thread 305 to send the requested information to the browser client 2 125.

This solution solves the delay problem experienced in FIG. 2, wherein one browser client dictates the speed by which other clients will retrieve data for concurrent requests, by having a producer dedicated to retrieving data from the web server. Generally, though, there is only one request for data from a web server at a time, i.e., only one browser client requesting the same information. Therefore, this approach creates multiple threads for each request even though the vast majority of cases have only one client wanting the information. Creating multiple threads for each request increases threading management and overhead for the system. In addition, when a browser client's request is canceled, e.g., the client unexpectedly goes offline, prior to receiving the entire document, the producer may continue to download data even though there is no client to receive it, thereby wasting network bandwidth.

Therefore, what is needed in the art is an improved method to retrieve information from a server for multiple clients.

SUMMARY OF THE INVENTION

Systems and methods consistent with the present invention satisfy the above need by presenting a method and system to store a document in a cache while allowing it to be served to multiple concurrent client processes. Threads are created that can function as a producer and consumer to retrieve information from a server and send it to multiple clients. While a thread is retrieving information for their client, it functions as a consumer. However, when their client needs additional information that is not contained in cache, the thread will take on the role of a producer to retrieve data from the server. Any thread has the capability to assume the role of a producer at any given time.

Desired characteristics of systems and methods consistent with the present invention include that once the data is obtained from the source, it should be placed locally in memory; subsequent read requests for the resource should be served from the cache; multiple concurrent requests for the same resource should not result in downloading the data from the resource more than once; and finally, a read request should not suffer high initial delay, such as that experienced with the approach discussed with the relationship to FIG. 1. It is desirable to keep the initial delay constant and hence independent of the total length of the resource.

Systems and methods consistent with the present invention have many advantages. First, they minimize thread usage, i.e., no additional threads are created to fill the cache. Specifically, the consumer thread does the job of the producer as well, thus reducing the number of threads created in a common case, such as that discussed in relationship with FIG. 3, by half.

Systems and methods consistent with the present invention also reduce response delay. The user receives intermittent feed back during the downloading thereby reinforcing the user that the system is working at downloading the requested document and preventing the user from disconnecting thinking that the end server is not responding.

Systems and methods consistent with the present invention also have the advantage of synchronizing processing overheads and performing a lazy data fetch. In synchronizing processing overheads, once a buffer in cache is marked complete, the consumer never needs to synchronize to read it. In using a lazy data fetch, data is fetched only on demand.

Systems and methods consistent with the present invention also provide the advantage of minimizing data copying. There is only one data copy from the source to the cache. Subsequently, every consumer does one data copy to its output streams. Therefore, the minimal amount of data copying is achieved.

And yet another advantage is the avoidance of busy waits. Busy waiting happens if a thread is contending for an activity for a shared resource and it does not want to block itself. In this case, the activity is to fill the buffer with data. The busy waiting is prevented by synchronizing the calls to fetch data from the web server. So a consumer is in one of three states, reading data from the buffer, filling the buffer by fetching data from the source, or blocked waiting to fetch data from the source.

In accordance with one aspect of the present invention, as embodied and broadly described herein, a method of retrieving information from a server process for a client process, comprises the steps of creating a first thread associated with a request for information from the server process, using the first thread, receiving a first data block of the requested information from the server process, transmitting the first data block of information to the client process, and transmitting a second data block of information to the client process, wherein the second data block was received from the server process using a second thread. The information received from the server processed may be cached. In addition, the information in the cache may be timestamped and removed from the cache when it exceeds a predetermined cache storage time limit, i.e., a time when it is deemed as too old. The system may receive multiple concurrent requests for information.

In accordance with one aspect of the present invention, as embodied and broadly described herein, a method for retrieving information from a server process for multiple client processes, comprises the steps of creating a plurality of consumer threads each associated with a client process, assigning a first one of the plurality of consumer threads as a producer thread, requesting information from a server process using the producer thread, and transmitting information received from the server process to a client process associated with one of the plurality of consumer threads. The method may also comprise the step of assigning a second one of the plurality of consumer threads as a producer thread. In addition, the method may further comprise the step of storing the information received form the server process in a cache, wherein the step of transmitting the information received from the server process comprises the step of transmitting information from the cache to the client process associated with the first one of the plurality of threads. Furthermore, the step of assigning the producer thread may comprise the steps of selecting the first one of a plurality of consumer threads associated with a client process which received the last data block of information from the cache and assigning the selected consumer thread as the producer thread. And finally, the method may also comprise the step of receiving multiple concurrent requests from the multiple client processes for the information.

BRIEF DESCRIPTION OF THE DRAWINGS

The accompanying drawings, which are incorporated in and constitute a part of this specification, illustrate an implementation of the invention and, together with the description, serve to explain the advantages and principles of the invention. In the drawings.

DETAILED DESCRIPTION

Reference will now be made in detail to an implementation consistent with the present invention as illustrated in the accompanying drawings. Wherever possible, the same reference numbers will be used throughout the drawings and the following description to refer to the same or like parts.
Introduction Systems and methods consistent with the present invention interface with client and server processes to speed the retrieval time of information retrieved from a server process for multiple concurrent requests from client processes for the information. The interface, or proxy server, includes access to cache memory to temporarily store the information, or document, retrieved from the server process for the client processes. The system creates an upper bound for any delays experienced by any one client process by incorporating both producer and consumer functions in each thread that is created in response to the client process request.

In more detail, systems and methods consistent with the present invention create a consumer thread for each client process requesting information from a server. Each thread may act as a producer or a consumer. As a producer, the thread retrieves the requested information from the server process and places it in a cache. As a consumer, the thread retrieves the information from the cache and transmits it to the client process.

As long as information is contained in the cache, each thread created will retrieve this information for the client process. However, as soon as one of the threads reaches the end of the data in the cache, it assumes the role as a producer and generates a request to the server process to retrieve more data for the cache. When the data is received from the server process, it is placed in cache, and the thread acting as a producer then reverts back to the role as a consumer and transmits the information to the client process associated with producer/consumer thread. Other threads may be retrieving information from the cache while the producer thread is retrieving the additional information from the server process. In addition, other threads may be waiting on the producer thread to complete the task of downloading the additional information into the cache before they continue to retrieve information for their respective client processes.

The cache may be logically divided into data blocks. As the data blocks are filled with information, the data block is then transmitted to the client process. This prevents a large initial delay in receiving information from the server process and places an upper limit on the delay.

As information is placed in the cache, it may be timestamped in order that it may be determined how long the information remains in the cache. Periodically, it may be desirable to remove information from the cache that has exceeded a cache storage time limit. Information kept in the cache beyond this limit may be considered "old" and therefore less reliable.

Figure 4:
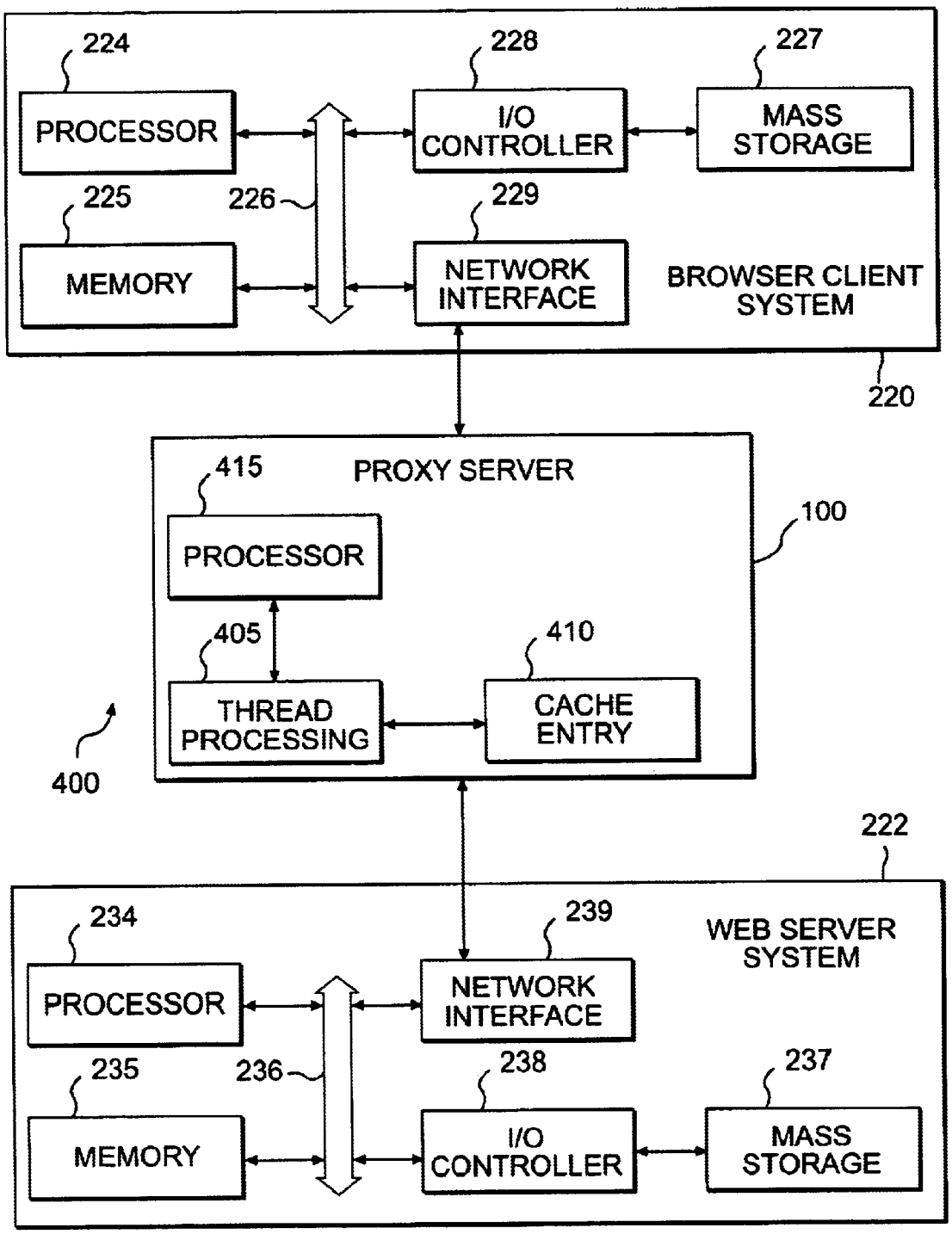
FIG. 4 depicts a computer network containing a client system and a server system.

FIG. 4 depicts a data processing system computer network containing a client system and a server system. In one embodiment, the browser client system 220 includes conventional components, such as a processor 224, memory 225 (e.g. RAM), a bus 226 which couples processor 224 and memory 225, a mass storage device 227 (e.g. a magnetic hard disk or an optical storage disk) coupled to processor 224 and memory 225 through an I/O controller 228 and a network interface 229, such as a conventional modem.

In one embodiment, the web server system 222 also includes conventional components, such as a processor 234, memory 235 (e.g. RAM), a bus 236 which couples processor 234 and memory 235, a mass storage device 237 (e.g. a magnetic or optical disk) coupled to processor 234 and memory 235 through an I/O controller 238 and a network interface 239, such as a conventional modem. Information requested by the browser client system 220 may be contained within the web server's memory 235 or the web server may have to access another server to retrieve the requested information. It will be appreciated from the description below that the systems and methods consistent with the present invention may be implemented in software which is stored as executable instructions on a computer readable medium on the client and server systems, such as mass storage devices 227 and 237 respectively, or in memories 225 and 235 respectively.

In this embodiment, a proxy server 100 is interfaced between the browser client system and the web server system. The proxy server 100 contains a processor 415, and a memory containing a thread processing component 405 and a cache entry 401. Various network topologies may be used to interface the browser client system 220 and the proxy server 100 as well as the proxy server and the web server 222. These network topologies include the Internet, a private network and an internal processor configuration that allows either various computer systems or modules within a single computer system to exchange information.

Figure 5:
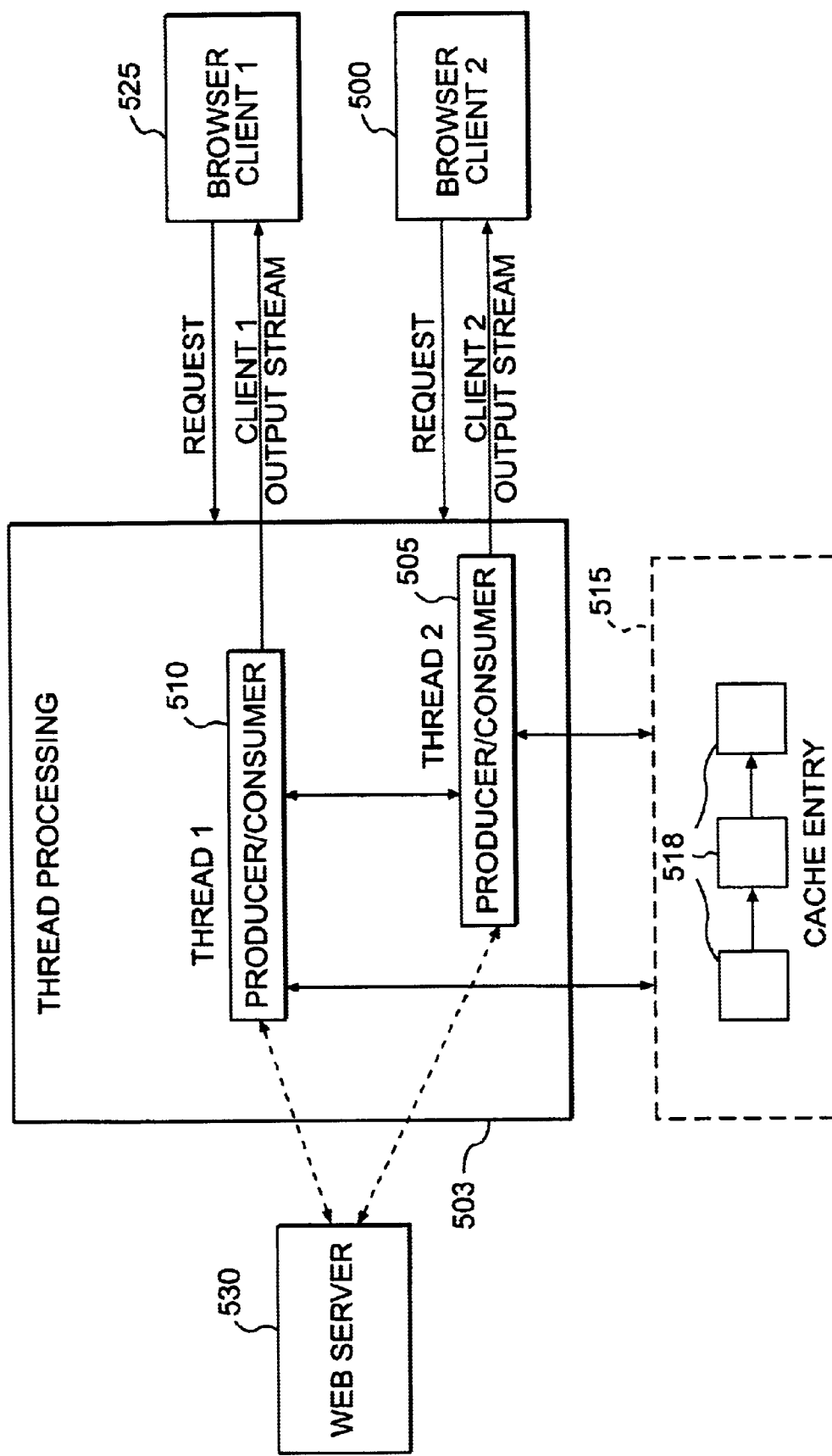
FIG. 5 depicts the architecture of a consumer thread also acting as a producer thread in a manner consistent with an exemplary embodiment of the present invention.

FIG. 5 depicts the thread processing wherein a consumer thread also acts as a producer thread in a manner consistent with an exemplary embodiment of the present invention. In this architecture, multiple browser clients, 500 and 525, submit concurrent requests for a document from a web server 530. In response to each of the browser clients 500 and 525 requests, a thread, 505 and 510, is created. In the embodiment depicted in FIG. 5, Thread 1 510 is created by the proxy server to service the browser client 1's 525 request and a Thread 2 505 is created to service browser client 2's 500 request. It is important to note that both threads 505 and 510 are both operative to function as a producer and a consumer in retrieving the information requested by the browser clients 500 and 525.

The cache entry 515 comprise cache entry data blocks 518. These data blocks are chained together and, in one embodiment, comprise a byte array and a pointer to the next data block in the chain. The end of the data pointer, called EOD pointer, points to the index of the last valid data byte in the last data block. Thread 1 510 and Thread 2 505 download the information from the cache entry 515, or more specifically, place the information from the data blocks 218 in the cache entry 515 into the output streams for the clients each thread is servicing.

While acting as a consumer, Thread 1 510 and Thread 2 505 may be retrieving data from the cache entry 515 or web server 530 at different rates. For example, the browser client 1 525 may be able to receive data much quicker than the browser client 2 500. Consequently, the Thread 1 510 will retrieve data from the cache entry at a faster rate because its client can receive data at a faster rate. In general, each thread is placing information into their respective client's output stream as fast as their browser client can receive the data.

When one of the threads, acting as consumer, encounters an EOD pointer in one of the data blocks 518 in the cache entry 515, and the requested document is not completely received by the client, then that thread begins to function as a producer thread to fetch more data from the web server 530. If the last data block is not full, the thread acting as a producer first fills it completely with information received from the web server and then creates subsequent blocks in the cache entry, if necessary. However, it is preferable that no one thread create more than one data block at a time to ensure that there is a guaranteed delay bound to the browser client that thread is servicing.

And while the thread is functioning as a producer, it fetches data from the web server 530 in a synchronized block. Synchronizing refers to the coordination between the other threads to ensure that only one thread is requesting data from the web server at a time. This synchronization will prevent other threads from also acting as a producer at the same time and thereby prevent multiple requests to the web server for the same data.

While the thread is functioning as a producer thread, other threads may still be retrieving data from the cache, unaware that the complete document is not in cache or that one of the threads has been functioning as a producer thread. It is only when these other threads hit the EOD pointer that they then try to assume the role as a producer. As stated above, it is preferable that this producer code is synchronized so if a thread has already assumed a role as a producer, all other candidates for producers must wait. It is also preferable that the data is fetched by doing block reads in the data block, thereby avoiding inefficiencies of single byte reads. Under this scheme, no extra threads are created because the consumer threads are also acting as producer threads to fetch data.

In addition, the time taken to download all the data in the cache entry is upper bounded by the minimum of time any one single thread would have taken. The initial startup delay is equal to the time taken to fill one data block. It will be recognized by those skilled in the art that the data block size may be configured by the administrator of the cache entry to balance tradeoffs of efficiency and delay. A larger buffer size results in a larger initial delay, but it also results in an efficient block read of the stream.

The consumer threads fetch the data themselves, hence if no consumer exists, the system does not waste its resources trying to fill entries that will never be used. This is the case wherein a browser client, acting as consumer, unexpectedly disconnects for some reason. Systems and methods consistent with the present invention do not try to continue to download data from the web server without the consumer present to receive the data. There are no overheads for synchronization once the buffer is declared complete or invalid.

Systems and methods consistent with the present invention achieve the minimum cache copying as well. The first time an entry is downloaded, two data copies are performed: 1) from the web server to the cache, and 2) from the cache to the output stream of the consumer. Subsequent readers suffer only a single copy from the buffer to the output stream. This is the minimum amount of data copying that can be achieved in any stream or unit scheme.

Figure 6:
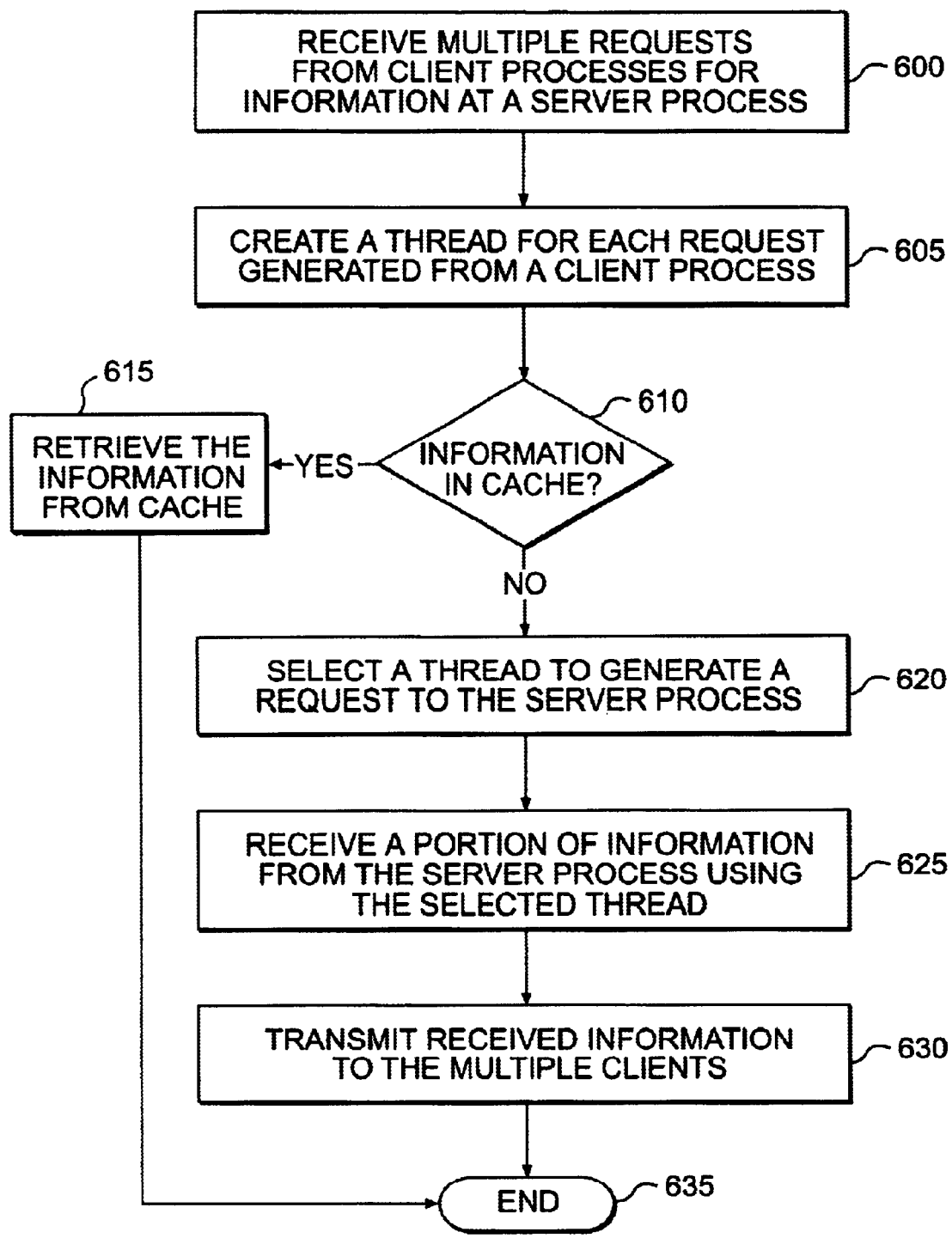
FIG. 6 is a flow chart depicting the steps involved in processing concurrent multiple client requests for information contained in a server in a manner consistent with an exemplary embodiment of the present invention.

FIG. 6 is a flow chart depicting the steps involved in processing concurrent multiple client requests for information contained in a server in a manner consistent with an exemplary embodiment of the present invention. In one embodiment, a proxy server is used to implement the present invention. In this embodiment, the proxy server first receives multiple requests from client processes for information from a server process (Step 600). These client processes are requesting the same document at roughly the same time, i.e., their requests overlap. Next, a thread is created for each request received from a client process (Step 605). In one embodiment, each of the threads created will have the ability to act as a producer and a consumer. As a producer, these threads will request the information from the server process, or web server, and place it in an input stream for cache entry. As a consumer, these threads will place the information from a cache into an output stream for a client process.

Following the creation of a thread, the cache is checked to determine if the information requested is contained within the cache (Step 610). If the information is in the cache, then the "Yes" branch is followed where the information is then retrieved from the cache (Step 615). It is in this case where the thread is acting as consumer to send the information from the cache to the client by placing the information, or as in one embodiment a data block contained in the cache, in the output stream for the client process. Following Step 615, the process ends (Step 635).

If at Step 610 the information was not contained in the cache, then the "No" branch is followed and the proxy server then selects a thread to generate a request to the server process (Step 620). Multiple threads may be acting as consumers but because the required information is not in cache, a fetch is required from the web server in order to populate the cache with information for this client process. In addition, this information will eventually be needed by the other clients submitting concurrent requests. In one embodiment of the present invention, the selection of a producer thread is performed by whichever thread reaches the EOD pointer in the cache. By allowing this thread to also act as a producer, it is guaranteed that the thread that is executing the most quickly will also be the one that retrieves the data from the web server.

Figure 1:
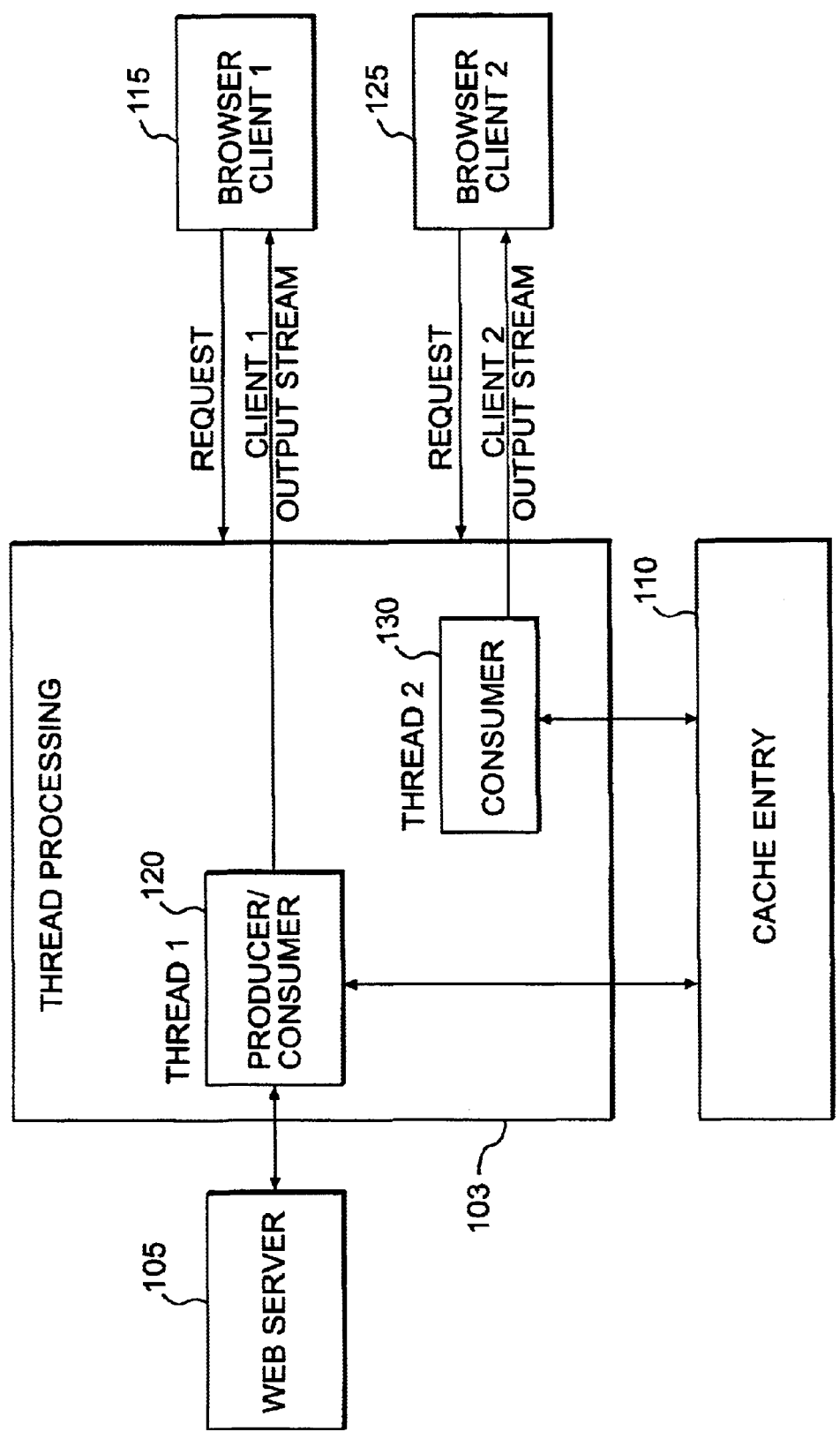
FIG. 1 depicts a system of downloading a document from a server process and sending it to client process.
Figure 2:
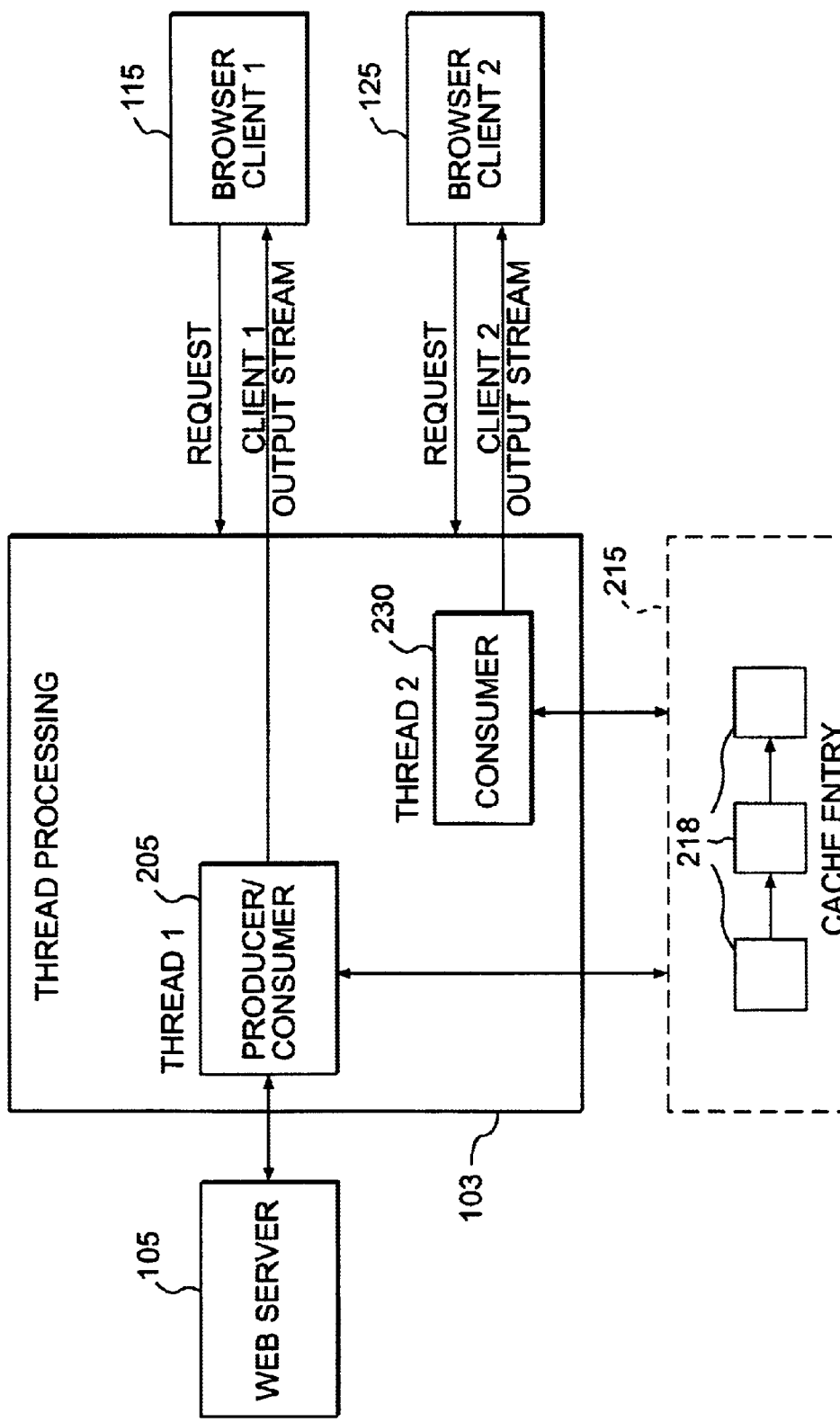
FIG. 2 depicts a system of downloading a document in segments for a client process.
Figure 3:
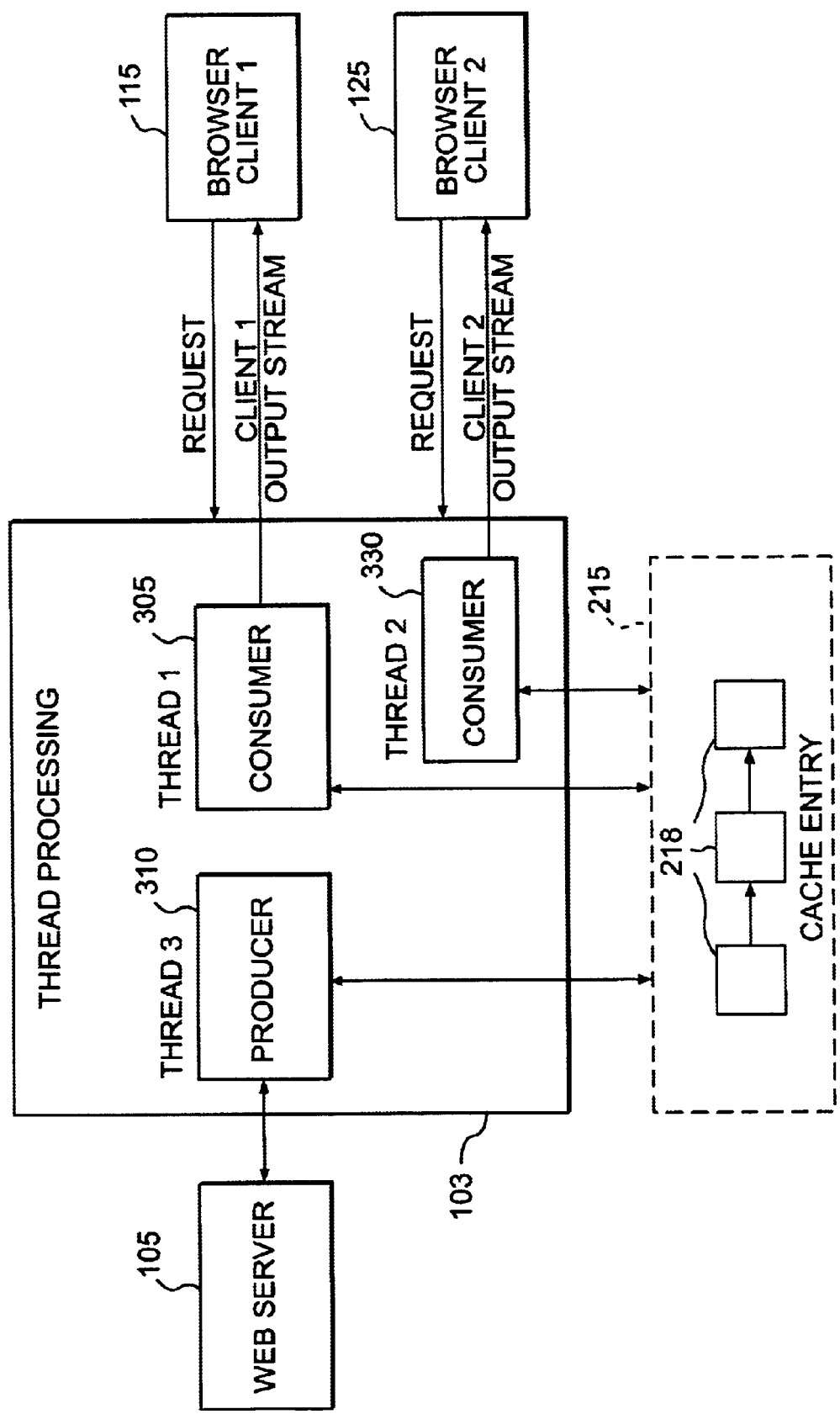
FIG. 3 depicts a system of using multiple threads as a producer and a consumer.

After a thread is selected to generate a request to the server process, a portion, or a data block, of the information from the server process is received using the selected thread (Step 625). It is preferable that only a portion be used thereby preventing or limiting the delay that one specific thread will evoke on the system when downloading information from the server process. As described with the prior art system with respect to FIG. 1, the larger the block of data retrieved from a web server, the larger the delay that any client waiting for that information will experience. It is preferable not to have the data block too large, thereby giving the user some feedback that the threads, and the web server, are processing their requests.

After receiving a portion of the information, it is transmitted to those clients waiting to receive the information (Step 630). The information is received into a cache and the cache is populated with the requests generated by the multiple clients. All these multiple clients are receiving the information from the cache at potentially varying data rates. As a specific client is ready for more data, additional information is transmitted to that client by the execution of that client's thread. In one embodiment, it is at this step, Step 630, where the information is transmitted from the cache to that client. This information will eventually be transmitted to all the clients that placed a request for this information but, as stated, clients may be in need of this data at different times.

Following the receipt of this information the process ends (Step 635). It should be recognized by those skilled in the art that while this step outlines a description of just downloading a portion of the information, that this process will continue indefinitely while there are clients still in need of information and where there is a web server still transmitting the information to one of the active threads.

Figure 7:
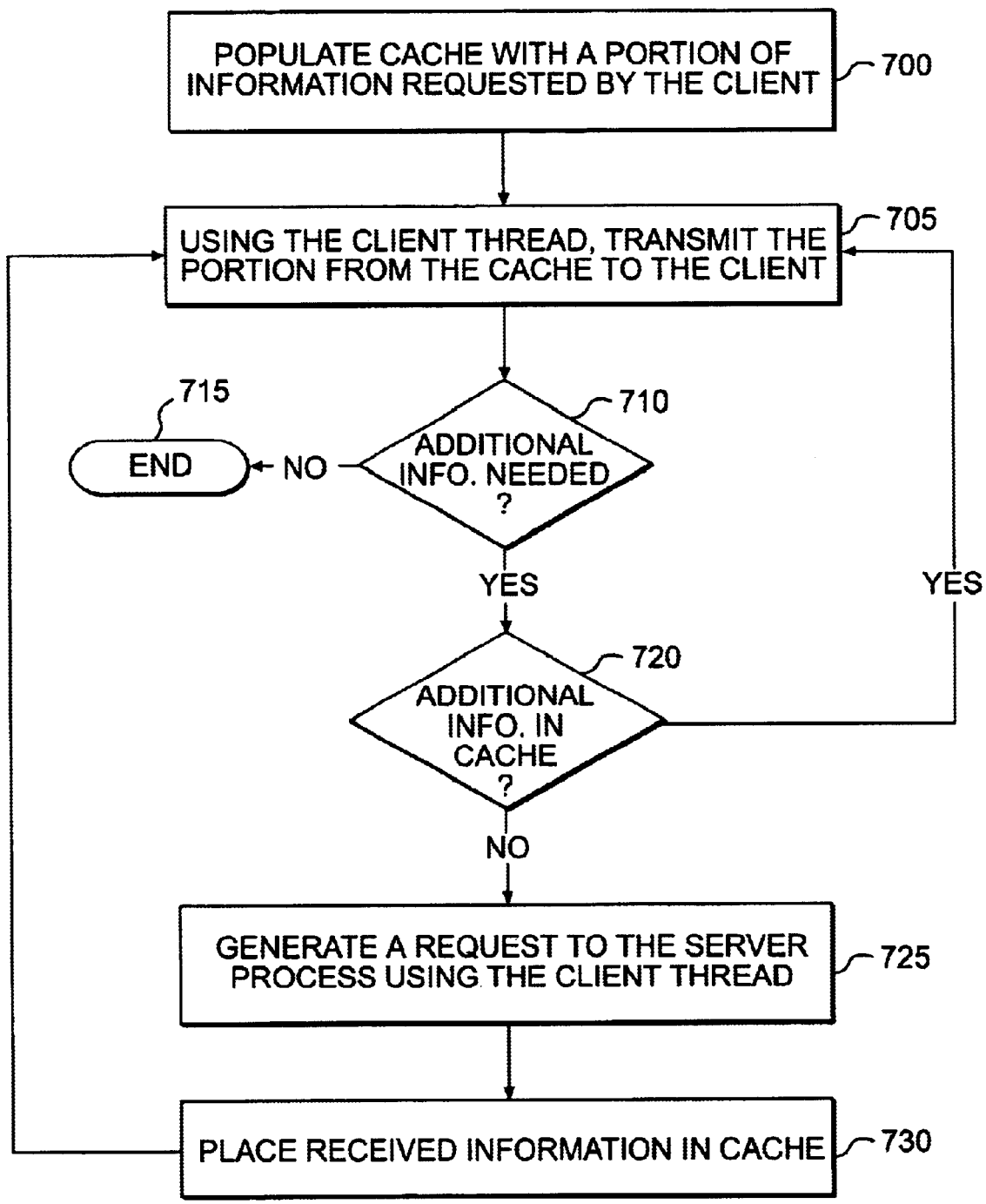
FIG. 7 is a flow chart depicting the steps showing a single thread functioning as a consumer and producer in a manner consistent with an exemplary embodiment of the present invention.

FIG. 7 is a flow chart depicting the steps showing a single thread functioning as a consumer and a producer in a manner consistent with an exemplary embodiment of the present invention. The cache is populated with a portion of information requested by a client (Step 700). It may be populated by the single thread associated with the client or by using another thread associated with another client's request. Using the single thread, this information is then transmitted from the cache to the client (Step 705). In one embodiment, this transmission may be performed by placing a portion of the data, e.g., a data block, into the output stream for receipt by the client. After receiving the portion of the information, the single thread then checks to see if additional information is needed to satisfy the client request (Step 710). If no additional information is needed, the process then ends (Step 715).

If additional information is needed then the "Yes" branch is followed and the cache is checked to determine if additional information is available to be downloaded to the client (Step 720). If the additional information for the client to receive is in the cache, then the "Yes" branch is followed back up to Step 705 where another portion of information is transmitted to the client from the cache. It is in this manner that the single thread is acting as a consumer, i.e., transferring data from the cache into the output stream for the client.

In the event there is no data, or insufficient data, in the cache to download to the client in Step 720 then the "No" branch is followed and the single thread generates a request to the server process, or web server, to download additional data to the cache (Step 725). By generating requests to the server process, the single thread has taken over the role as a producer. As a producer, it is requesting data from the server process to be placed into the cache for the client associated with this single thread as well as the other clients that may have also requested the same data. In one embodiment the present invention, only one thread will act as a producer at one time. This prevents the duplication of having multiple threads requesting the same information from a web server. This also minimizes the overall delays of the clients receiving their desired information.

After the request is generated and sent to the server process, data retrieved from the server process is placed in a cache by the single thread now acting as a producer (Step 730). After placing the information in the cache, the single thread will also place it in an output stream for the client associated with the single thread. In addition, at this time, there may also be other threads waiting for the information that were blocked from placing a request to the web server by the preferred embodiment of using synchronization to only allow one producer to request data. Therefore, in this instance, those other clients can then also download the data to their associated client process that has been received into the cache by the single thread.

Conclusion

Systems and methods to retrieve information from a server process for multiple concurrent client process requests thus facilitates the distribution of the server information in addition to placing an upper boundary on the delays imposed to any one client process. In addition, by allowing each thread, created in response to a client process request, to assume the role as a producer and a consumer, systems and methods consistent with the present invention reduce threading overheads.

The foregoing description of an implementation of the invention has been presented for purposes of illustration and description. It is not exhaustive and does not limit the invention to the precise form disclosed. Modifications and variations are possible in light of the above teachings or may be acquired from practicing of the invention. For example, the described implementation includes software but systems and methods consistent with the present invention may be implemented as a combination of hardware and software or in hardware alone. The invention may be implemented with both object-oriented and non-object-oriented programming systems. Additionally, although aspects of the present invention are described as being stored in memory, one skilled in the art will appreciate that these aspects can also be stored on other types of computer-readable media, such as secondary storage devices, like hard disks, floppy disks, or CD-ROM, a carrier wave from the Internet or other propagation medium; or other forms of RAM or ROM. The scope of the invention is defined by the claims and their equivalents.

What is claimed is:

1. A method of retrieving information from a server for a client, comprising the steps of:

creating a first thread associated with a request by the client for information from the server, wherein the first thread stores information in a memory and transmits information from the memory to the client;

using the first thread, storing a first data block of the requested information from the server into the memory;

transmitting the first data block of information to the client using the first thread;

transmitting a second data block of information to the client using the first thread, wherein the second data block was stored in the memory using a second thread, the second thread being associated with another client and being operative to store information in the memory and transmit information from the memory to the another client;

determining when one of the first and second threads requires an additional data block of information; and requesting the additional data block of information from the server using the one of the first and second threads on behalf of the other of the first and second threads while restricting the other of the first and second threads from requesting the additional data block of information from the server.

2. The method of claim 1 further comprising the step of storing the first data block and the second data block of information in a cache.

3. The method of claim 2 further comprising the steps of timestamping the information stored in the cache; and removing information from the cache that exceeds a predetermined cache storage time limit.

4. The method of claim 1, wherein the first thread and the second thread are created in response to receiving multiple concurrent requests.

5. The method of claim 1, wherein the first thread and second thread are both operative as a consumer and a producer.

6. A method for retrieving information from a server for multiple clients, comprising the steps of:

creating a plurality of threads associated with clients, wherein at least one of the threads can operate as a producer thread that stores information in a memory and as a consumer thread that transmits information from the memory;

determining when a first one of the plurality of threads requires additional information;

requesting the additional information from a server using the first one of the plurality of threads as a producer thread on behalf of the other of the plurality of threads while restricting the other of the plurality of threads from requesting the additional information from the server; and transmitting the additional information from the memory using the first one of the plurality of threads as a consumer thread.

7. The method of claim 6 further comprising the step of assigning a second one of the plurality of consumer threads as a producer thread.

8. The method of claim 6 further comprising the step of storing the information received from the server in a cache, wherein the step of transmitting the additional information received from the server comprises the step of transmitting information from the cache to the client associated with the first one of the plurality of consumer threads.

9. The method of claim 8, wherein the information is stored in a data block in the cache.

10. The method of claim 9, wherein the step of determining when the first one of the plurality of consumer threads requires additional information comprises the steps of:

selecting the first one a plurality of consumer threads associated with a client which received the last data block of information from the cache; and assigning the selected consumer thread as a producer thread.

11. The method of claim 9 further comprising the steps of:

timestamping the information stored in the cache; and removing information from the cache that exceeds a predetermined cache storage time limit.

12. The method of claim 6 further comprising the step of receiving multiple concurrent requests from the multiple clients for the information.

13. A method for sending information to multiple clients from a server, comprising the steps of:

creating respective threads for requests for information from the multiple clients, wherein at least one of the threads can operate as a producer thread that stores information received from the server into a memory and as a consumer thread that retrieves information from the memory;

determining when one of the threads requires additional information for one of the multiple clients;

requesting the additional information from a server using one of the threads as a producer thread on behalf of the other of the threads while restricting the other of the threads from requesting the additional information from the server;

receiving the additional information from the server in response to the request by the one of the threads that is operating as the producer thread;

storing the additional information in the memory using the one of the threads as the producer thread;

for each client, retrieving the additional information from the memory using respective threads associated with each client as consumer threads.

14. The method of claim 13, wherein the step of determining when the one of the consumer threads requires additional information comprises the steps of:

selecting the one of the consumer thread associated with a client which received the end of the information retrieved from the server; and assigning the selected one of the consumer threads as the producer thread.

15. The method of claim 13 further comprising the step of placing the received information from the server in a cache.

16. The method of claim 15, wherein the information is placed within data blocks in the cache.

17. The method of claim 16 further comprising the steps of:

timestamping the information placed in the cache; and removing information from the cache that exceeds a predetermined cache storage time limit.

18. The method of claim 15, wherein each client retrieving data from the cache retrieves data from the cache independently of other clients.

19. The method of claim 18, wherein the step of requesting the additional information from the server using the one of the consumer threads as a producer thread comprises the step of synchronizing the request for additional information from the server with operations of other consumer threads.

20. A method of retrieving information from a server for multiple clients, comprising the steps of:

creating a plurality of respective threads each associated with a client and operative to function as a consumer that retrieves information from a cache and a producer that stores information in the cache;

requesting a data block of information from the server using a first one of the plurality of threads;

storing the data block received from the server in a cache using the first one of the plurality of threads as a producer;

transmitting the data block of information from the cache to a first client using the first one of the plurality of threads as a consumer;

requesting a second data block of information from the server using a second one of the plurality of threads;

storing the second data block of information from the server in the cache using the second one of the plurality of threads as a producer;

determining when one of the first one and second one of the plurality of threads requires an additional data block of information from the server based on a status of the cache; and requesting the additional data block of information using the one of the first one and second one of the plurality of threads as a producer on behalf of the other of the plurality of threads while restricting the other of the first one and second one of the plurality of threads from requesting the additional data block of information.

21. The method of claim 20 further comprising the step of transmitting the second data block of information to the first client using the first one of the plurality of threads.

22. The method of claim 20 further comprising the step of receiving multiple concurrent requests by the multiple clients.

23. The method of claim 20, wherein the thread used as a producer is associated with the client which received the last data block of information in the cache.

24. The method of claim 20 further comprising the steps of:

timestamping the information stored in the cache; and removing information from the cache that exceeds a predetermined cache storage time limit.

25. A data processing system for retrieving information from a server for multiple client requests, comprising:

a memory containing:

a cache entry for storing information, and a thread processing component that creates a plurality of respective threads each associated with a client, wherein each thread is operative to function as a producer thread that stores information in the memory and a consumer thread that retrieves information from the memory;

assigns a first one of the plurality of the threads as a producer thread;

requests information from a server using the first one of the plurality of the threads as the producer thread, and transmits information received from the server to a client using the first one of the plurality of threads as a consumer thread;

determines when the first one of the plurality of threads requires additional information from the server;

requests the additional information from the server using the first one of the plurality of threads as the producer thread on behalf of the other of the plurality of threads while restricting the other of the plurality of threads from requesting the additional information from the server; and a processor for running the thread processing component.

26. A computer readable medium containing computer-executable instructions for receiving information from a server for a client to perform a method, comprising the steps of:

creating a first thread associated with a request by the client for information from the server, wherein the first thread stores information in a memory and transmits information from the memory to the client;

using the first thread, storing a first data block of the requested information from the server into the memory;

transmitting the first data block of information to the client using the first thread;

transmitting a second data block of information to the client using the first thread, wherein the second data block was stored into the memory using a second thread, the second thread being associated with another client and being operative to store information in the memory and transmit information from the memory to the another client;

determining when one of the first and second threads requires an additional data block of information; and requesting the additional data block from the server using the one of the first and second threads on behalf of the other of the first and second threads while restricting the other of the first and second threads from requesting the additional data block of information.

27. An apparatus for receiving information from a server for a client, comprising:

means for creating a first thread associated with a request by the client for information from the server, wherein the first thread stores information in a memory and transmits information from the memory to the client;

means for storing a first data block of the requested information from the server into the memory;

means for transmitting the first data block of information to the client;

means for transmitting a second data block of information to the client using the first thread, wherein the second data block was stored into the memory using a second thread, the second thread being associated with another client and being operative to store information in the memory and transmit information from the memory to the another client;

means for determining when one of the first and second threads requires an additional data block of information; and means for requesting the additional data block from the server using the one of the first and second threads on behalf of the other of the first and second threads while restricting the other of the first and second threads from requesting the additional data block of information.

\* \* \* \* \*